April 19, 1966 J. J. McHUGH 3,247,332

HOUSING FOR WALL MOUNTED TELEPHONES

Filed May 2, 1962 2 Sheets-Sheet 1

INVENTOR.
JAMES J. Mc HUGH

BY

Mead, Browne, Schuyler & Beveridge
ATTORNEYS

April 19, 1966 J. J. McHUGH 3,247,332

HOUSING FOR WALL MOUNTED TELEPHONES

Filed May 2, 1962 2 Sheets-Sheet 2

INVENTOR.
JAMES J. Mc HUGH
BY
Mead, Browne, Schuyler & Beveridge
ATTORNEYS 3,247,332

HOUSING FOR WALL MOUNTED TELEPHONES

James J. McHugh, Avondale Estates, Ga., assignor to Gladwin Plastics, Inc., Atlanta, Ga., a corporation of Georgia Filed May 2, 1962, Ser. No. 191,853
6 Claims. (Cl. 179—183)

This invention relates to housings for wall mounted public telephones and, more particularly, to an improved form of housing for addition to existing non-housed public telephones.

At the present time, a large number of public telephones are mounted directly on the walls of various establishments without any enclosure. These installations conventionally consisting of the familiar telephone unit itself, which is supplied by the telephone company and a wooden back board upon which the telephone is mounted and whose upper portion conforms to the peripheral shape of the telephone. The back board projects downwardly from the bottom of the main telephone unit, and the conventional ringer box or sub-set is secured to the back board at a location spaced below the main telephone housing.

In installations of the type with which the present invention is concerned, the structure described briefly above is mounted directly on a wall surface and the entire installation consists only of the parts described above. While such an installation is serviceable, it has certain undesirable features. The most obvious of these features is that the telephone is completely exposed and, since most phones of this type are mounted in relatively busy locations, the phone is completely unshielded from background noise and is deficient in privacy. In an effort to overcome these latter objections, the telephone is frequently mounted in a location such that it is inconspicuous or easy to overlook.

In recent years, many new installations of public telephones have been provided with housing or partial enclosures which afford a reasonable degree of privacy. In the usual case, these installations have included illuminated signs announcing the presence of a public telephone. It has been found that installations of this type are given substantially greater usage than the non-housed installations, the increased usage presumably being due both to the increased privacy available and to the conspicuous identification of the installation.

Substantially all of the housings or partial enclosures for wall mounted telephones have been installed in new buildings or installations, and the enclosures presently available on a commercial scale are designed to be installed at the same time as the telephone. Thus, in order to install enclosures of this type on existing non-enclosed wall mounted telephones, a considerable labor cost is incurred because it is necessary to temporarily disconnect and remove the telephone from the wall during the installation of the enclosure.

It is therefore an object of the present invention to provide a new and improved housing for partially enclosing a wall mounted telephone, and which may be readily installed on existing wall mounted telephone installations without disturbing the telephone installation.

It is another object of the present invention to provide such a housing for partially enclosing an existing wall mounted telephone installation which may be factory assembled and installed in the field with a minimum amount of effort.

It is a further object of the present invention to provide such a housing for partially enclosing a wall mounted telephone in accordance with the foregoing objects which provides an acceptable degree of privacy for the user and in which the telephone installation is conspicuously visible.

Other objects and features of the invention will become apparent by reference to the following specification and to the drawings.

Figures 1, 3, 4, 5:
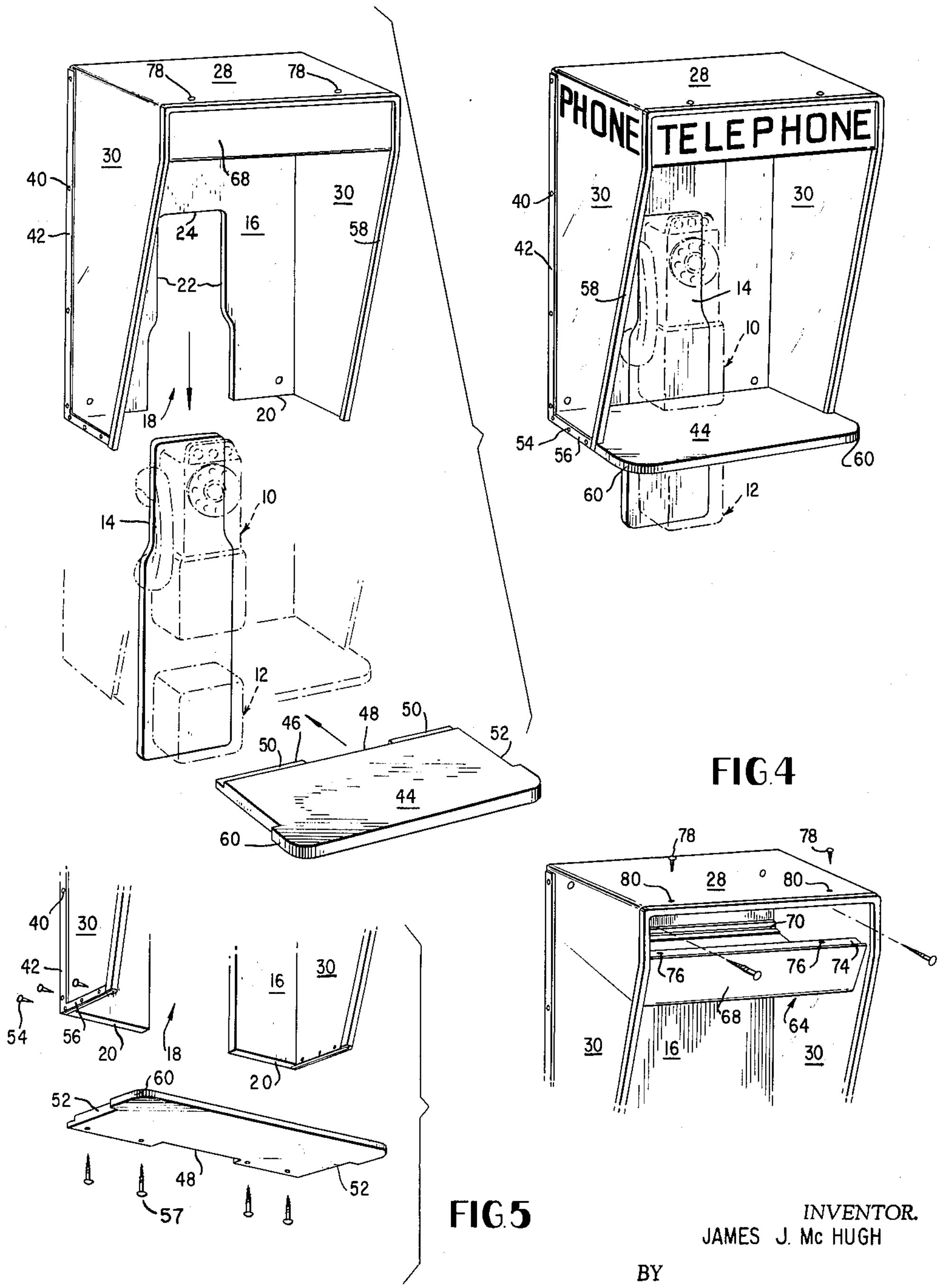
FIG. 1 is a perspective view of a telephone installation embodying the present invention, the telephone and its ringer box or sub-set being shown in dot dash lines.
FIG. 3 is a perspective view showing the manner in which the housing is installed on an existing non-housed wall telephone.
FIG. 4 is a partial perspective view of the upper portion of the housing showing the ceiling unit partially open.
FIG. 5 is a partial perspective view of the lower portions of the housing.

Referring now to the drawings, and particularly to FIG. 3, a conventional non-housed wall mounted telephone installation includes the familiar telephone itself designated generally 10, and the ringer box or sub-set 12, both of which are mounted upon a back board 14 which is a standard part supplied by the telephone company and which is employed to mount the installation on the wall. The outline or side edges of back board 14 are shaped to conform to the top and side surface of the phone 10, while ringer box 12 is secured to back board 14 at a location spaced below the phone 10.

The housing unit which is the subject of the present invention includes a generally rectangular back panel 16 whose thickness is preferably substantially the same as the thickness of the telephone back board 14. An opening 18 extends upwardly from the lower edge 20 of back panel 16, the opposed side edges 22 and top edge 24 of opening 18 being complementary in shape to the corresponding peripheral edges of telephone back board 14. Back panel 16 may thus be moved into operative relationship with back board 14 by placing back panel 16 upon the wall above the already installed telephone and then sliding back panel 16 downwardly as indicated in FIG. 3 so that the top and side edges of back board 14 are received within opening 18. This arrangement permits back panel 16 to be located upon the wall with the side and top edges of back board 14 fitted snugly within opening 18 while avoiding any interference, during the placement of back panel 16, with the outwardly projecting portions of telephone 10 such as the coin slots and receiver hook. Back panel 16 is fixedly secured to the wall surface by any suitable means, not shown, the specific means being selected in accordance with the wall construction.

Figure 2:
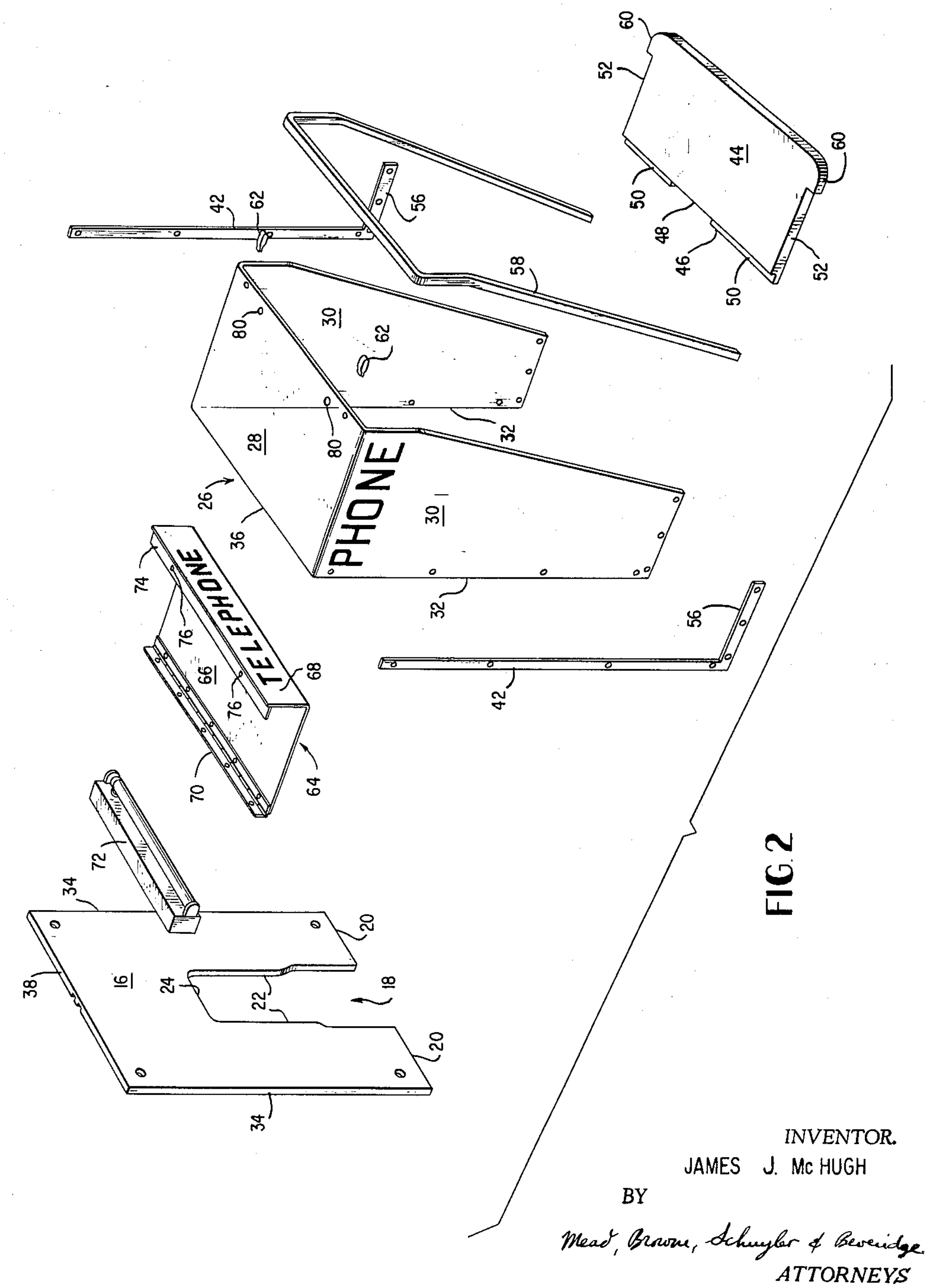
FIG. 2 is an exploded perspective view of the housing of FIG. 1.

A combination side and top wall member designated generally 26 is constructed as an integral unit from a blank of transparent plastic sheet material, best seen in FIG. 2. Side and top wall assembly 26 includes a rectangular horizontal top wall portion 28 which is integrally joined at each of its opposed side edges to the upper edges of vertical side wall portions 30. The rear edges 32 of side wall portions 30 are equal in length to the vertical side edges 34 of back panel 16, while the rear edge 36 of top wall portion 28 is equal in length to the edge 38 of back panel 16. Side and top wall assembly 26 is fixedly mounted upon back panel 16 by screws 40 which pass through the side wall portions and into the respective edges 34 of back panel 16. Preferably a metallic edging strip 42 is mounted between the heads of screws 40 and the respective side wall portions 30. Back panel 16 fits snugly within the inverted U-shaped side and top wall member 26 with the edges 34 and 38 of back panel in engagement with the inner and under sides respectively of side wall portions 30 and top wall portion 28.

A horizontal shelf 44 is detachably secured to the assembled back panel and side and top wall units to pass across back board 14 of the telephone installation between the telephone 10 and ringer box 12. The rearward edge 46 of shelf 44 is formed with a notch 48 which is dimensioned to receive back board 14 while permitting the rear edge 46 of shelf 44 to be positioned in flush engagement with the wall upon which the installation is mounted. On each side of notch 48, rear edge 46 is grooved as at 50 to provide a seat for the lower edge portions 20 of back panel 16. The side edges 52 of shelf 44 are spaced to fit snugly between the lower ends of side wall portions 30 when shelf 44 is operatively located with respect to back panel 16.

Shelf 44 is detachably secured (FIG. 5) in its horizontal position by screws 54 which pass successively through a strip of metallic edging 56 and the lower ends of side wall 30 and by screws 57 which pass through shelf 44 into lower edge 20 of back panel 16. Preferably, the front edges of side and top wall member 26 are seated within a channel shaped member of metallic trim 58 and side edges 52 of shelf 44 are projected outwardly as at 60 to be flush with or project outwardly beyond the sides of channel 58. Channel 58 may be secured in position by a pair of clips 62 which clip the channel to top wall portion 28, the lower ends of channel 58 being held in position by the projections 60 of shelf 44.

In the assembled housing, a box-like compartment is defined at the top of side and top wall member 26 by a ceiling assembly designated generally 64 which includes a ceiling portion 66 and a front wall portion 68. Ceiling 66 and front wall 68 are preferably formed from a single piece of transparent plastic sheet and the peripheral dimensions of ceiling 66 are such that the ceiling assembly fits snugly between side wall portions 30. A piano hinge 70 on the rearward edge of ceiling 66 serves to mount ceiling assembly 64 upon back panel 16, the pivot axis of the hinge extending horizontally across back panel 16 at a location spaced below top edge 38 such that in the assembled housing front wall 68 is in abutment with the under surface of top wall portion 28 when ceiling 66 is in a horizontal position.

A fluorescent lighting fixture of conventional construction 72 is mounted upon back panel 16 between top edge 38 and piano hinge 70 to illuminate the interior of the box-like compartment cooperatively defined by ceiling assembly 64, top wall portion 28 and the upper portion of side wall portions 30. A metallic channel member 74 is mounted along the upper edge of front wall 68 and tapped and bored as at 76 to receive screws 78 which are freely received within bores 80 in top wall portion 28. Ceiling assembly 64 may thus be held in its normally closed position by screws 78 which may be threaded out of channel 74 to permit ceiling assembly 64 to swing downwardly about hinge 70 to effect replacement of the light of fixture 72 when necessary. Preferably, front wall 68 and the upper portions of side wall portions 30 are provided with the indicated indicia which may be applied to the inner surfaces of the transparent plastic sheet by a silk screen or other suitable process.

The housing described above is, in the usual case, shipped to the point of installation in a fully assembled position. To assemble the unit onto an existing wall mounted telephone installation, shelf 44 is temporarily detached from the assembly by the removal of screws 54 and 57. The housing, minus shelf 44, is then moved into position above the telephone installation as in FIG. 3 with the rear surface of back panel 16 flush against the wall upon which the telephone is installed. The housing is then slide downwardly along the wall, the back board 14 of the telephone installation entering opening 18 and the housing eventually becoming seated upon back board 14 which entirely fills opening 18 when the housing is in its final position. Back panel 16 is then fixedly mounted to the wall by whatever means may be most convenient. It will be noted that when the housing is in its final position, the lower edge 20 of back panel 16 does not extend down to the bottom of back board 14, but rather is at a level located between the lower end of the telephone 10 and above ringer box 12. Shelf 44 is then replaced by inserting the shelf horizontally into its final position from the front and replacement of screws 54 and 57 completes the assembly.

From the foregoing, it is believed apparent that the housing described above can be readily installed on existing wall mounted telephones with no disturbance whatsoever to the telephone installation. The housing, when completely installed, presents the same outward appearance as a custom built housing.

While one exemplary embodiment of the invention has been described, it will be apparent to those skilled in the art the disclosed embodiment may be modified. Therefore, the foregoing description is to be considered exemplary rather than limiting and the true scope of the invention is that defined in the following claims.

I claim:

1. A telephone housing comprising a back panel having an opening extending upwardly from its lower edge, the edges of said opening being complementary in shape to the configuration of and fitted over the top and side peripheral surfaces of a wall mounted telephone, a horizontal shelf member having a rear edge and opposed side edges extending forwardly from said rear edge, means detachably securing said rear edge of said shelf member to the lower edge of said back panel, a transparent side and top wall assembly secured to said back panel and projecting forwardly from the side and top edges of said back panel to partially enclose said telephone, and means detachably securing the lower edges of the side wall portions of said side and top wall assembly to the respective side edges of said shelf member.

2. A telephone housing as defined in claim 1 wherein said side and top wall assembly comprises a unitary member of transparent sheet material with the side wall portions of said assembly integrally joined along their upper edges to respective opposed side edges of a generally rectangular top wall portion.

3. A telephone housing as defined in claim 2 further comprising a generally rectangular ceiling member of transparent sheet material hingedly mounted along its rear edge to said back panel for pivotal movement about a horizontal axis spaced downwardly from the top edge of said back panel, a transparent front wall fixedly secured to the forward edge of said ceiling member, means detachably securing the upper edge of said front wall to the forward edge of the top wall portion of said side and top wall assembly, and a lighting fixture mounted upon said back panel between the top edge of said back panel and the rear edge of said ceiling member.

4. In combination with a wall telephone installation including a back board mounted upon a wall and fixedly secured to the rear of said telephone, the side edges of said back board having the same general peripheral shape as the adjacent surfaces of said telephone; a housing assembly partially enclosing said telephone installation comprising a generally rectangular back panel having a thickness equal to the thickness of said back board, said back panel having an opening therein extending upwardly from its lower edge complementary in shape to said back board and receiving the side and top edges of said back board, a shelf member having a rear edge and opposed side edges extending forwardly from said rear edge in perpendicular relationship thereto, means detachably securing said rear edge of said shelf member to the lower edge of said back panel, a one piece combination side and top wall member of transparent sheet material having a pair of opposed side wall portions integrally joined at their upper edges to the respective side edges of a rectangular top wall portion, means securing said side and top wall member to said back panel with the rear edges of said side and top wall portions respectively engaged with the side and top edges of said back panel, and means detachably securing the lower edges of said side wall portions to the respective side edges of said shelf member to support said shelf member in a horizontal position.

5. In combination with a telephone fixedly mounted upon a vertical wall surface by a back board secured to said telephone and to said wall surface; a housing assembly having a pair of spaced opposed forwardly projecting side walls, a back panel fixedly secured to and extending between the rearward edges of said side walls, said back panel having a central opening therein extending upwardly from the lower edge of said panel complementary in shape to said back board and receiving the top and side edges of said back board to locate said side walls in symmetrically spaced relationship on opposite sides of said telephone, and a shelf member detachably secured to the lower edge of said back panel and the lower edges of said side walls.

6. In combination with a wall telephone installation comprising a telephone and a ringer box mounted in vertically spaced relationship upon a back board secured to a vertical wall surface; a housing assembly having a pair of spaced opposed forwardly projecting side walls, a back panel fixedly secured to and extending between the rearward edges of said side walls, said back panel having a central opening therein extending upwardly from the lower edge of said panel complementary in shape to the peripheral edges of said back board above said ringer box, said housing assembly engaging the peripheral edges of said back board with the edges of said opening, and a horizontal shelf detachably secured to the lower edges of said side walls and said back panel extending horizontally across said back board between said telephone and said ringer box, said shelf having a notch in the rearward edge thereof receiving said back board.

References Cited by the Examiner

UNITED STATES PATENTS

| | | | |
|---|---|---|---|
| 1,588,566 | 6/1926 | Wismer | 248—224 |
| 1,651,987 | 12/1927 | Baker | 211—87 |
| 2,585,743 | 2/1952 | Cooper | 312—245 |
| 2,822,230 | 5/1958 | Curran. | |
| 2,982,593 | 5/1961 | Chambers | 20—3.5 X |

FRANK L. ABBOTT, *Primary Examiner.*

JACOB L. NACKENOFF, *Examiner.*